July 19, 1932. W. E. WOODARD 1,868,340
RAILWAY VEHICLE SUPPORTING STRUCTURE
Filed Nov. 6, 1928 3 Sheets-Sheet 3
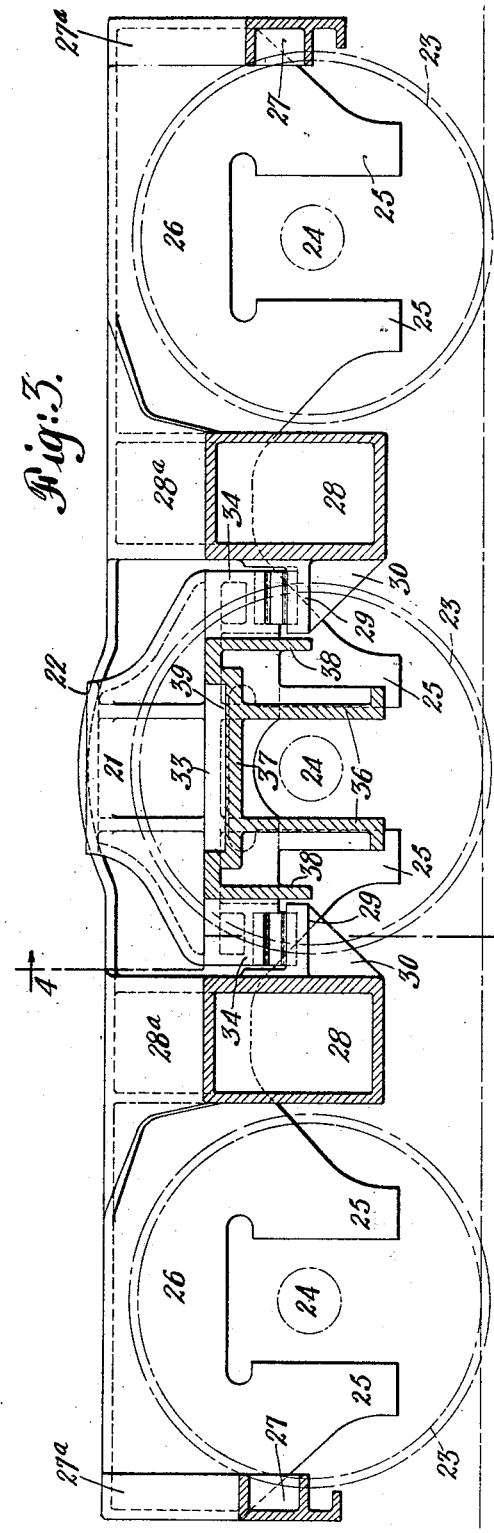
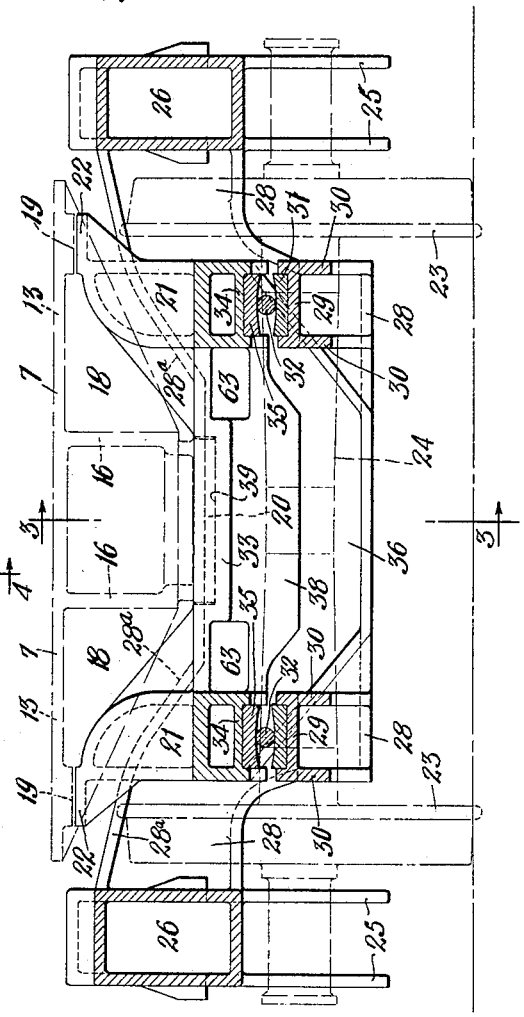
INVENTOR
William E. Woodard
BY
Synnestvedt + Lechner
ATTORNEYS Patented July 19, 1932

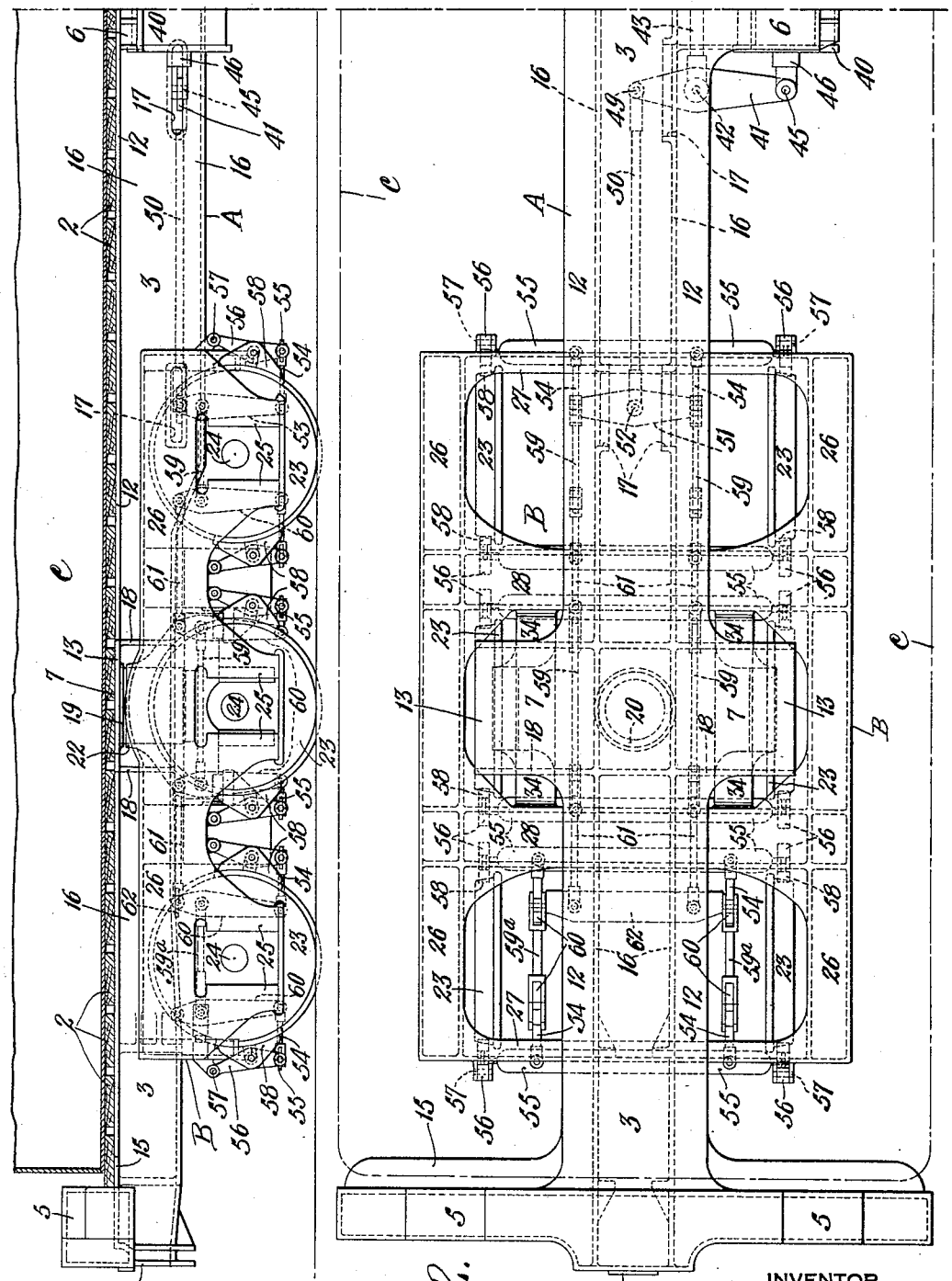

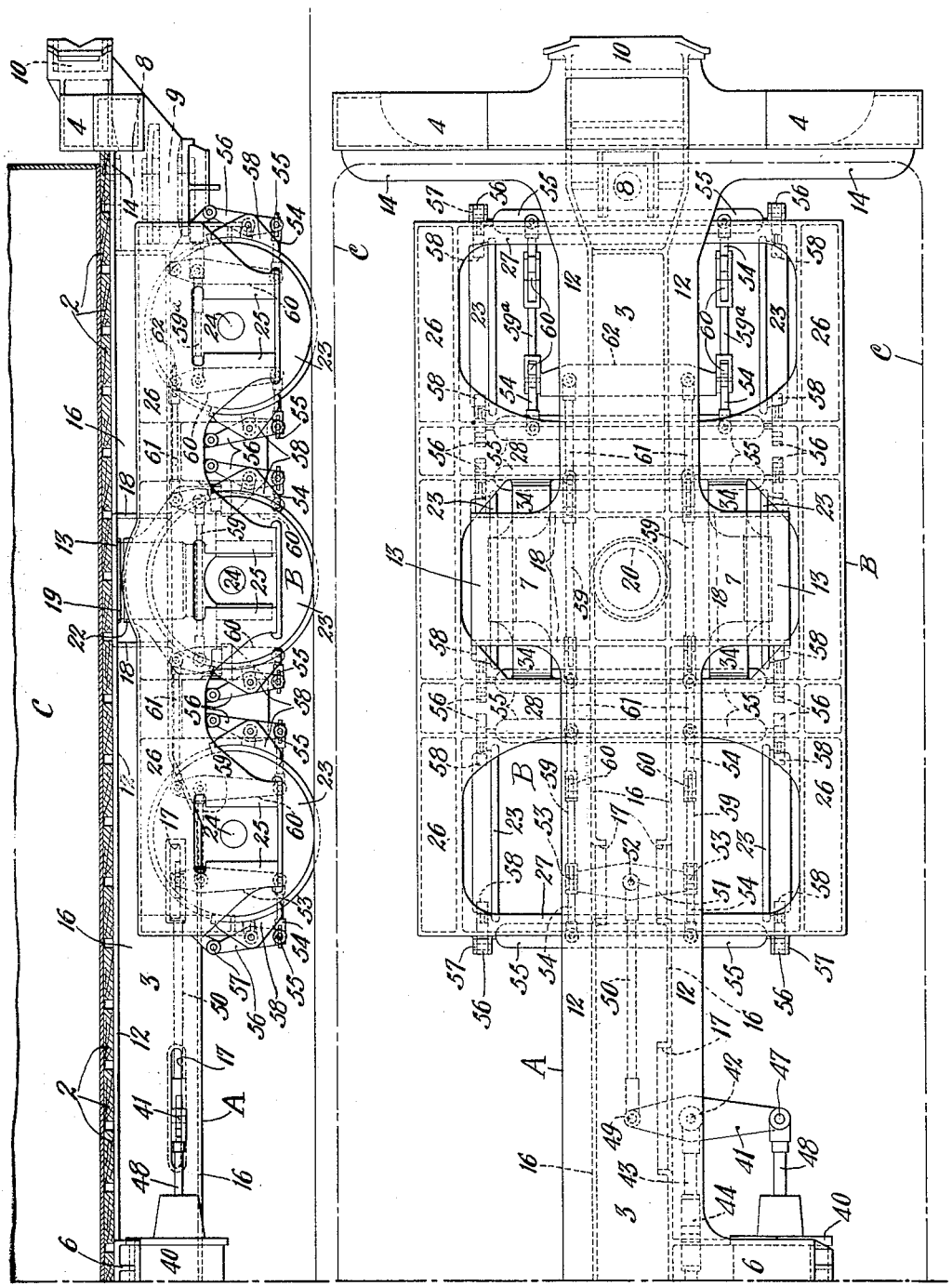

1,868,340

UNITED STATES PATENT OFFICE

WILLIAM E. WOODARD, OF FOREST HILLS, NEW YORK

RAILWAY VEHICLE SUPPORTING STRUCTURE

Application filed November 6, 1928. Serial No. 317,509.

This invention relates to railway vehicle supporting structures, with particular reference to the main and truck frame structures of such vehicles.

The invention may be utilized in connection with various forms of railway vehicles, but I have here illustrated it as applied to a locomotive tender, in which it is particularly useful since the invention primarily contemplates the substantial lowering of the centre of gravity of the vehicle, and such lowering of the centre of gravity of a tender, with its fuel and water tank and the contents thereof, is particularly advantageous.

One of the primary objects of the invention, as above indicated, is the lowering of the centre of gravity of railway vehicles, such as locomotive tenders, from which naturally follows the object of making possible the increasing of the capacity of such vehicles without exceeding clearance limitations and without producing conditions of topheaviness.

The invention further contemplates, in the attainment of the foregoing, the lowering of the main frame of the vehicle with respect to the rail, and in addition, the lowering of certain parts of each truck with a resultant lowering of the centre of gravity thereof, and this without reducing wheel diameter.

I also aim by the invention to simplify the support of the brake rigging for the vehicle, to protect the same against damage, and to insure direct longitudinal transmission of operating stresses therein.

The invention contemplates further the attainment of all the foregoing advantages without any sacrifice in strength or rigidity in main or truck frames, and more particularly by the provision of novel main and truck frame structures which are very rugged in proportion to their weight and which cooperates together in a harmonious manner to attain the desired ends.

How these objects and advantages, as well as others which are incident to the invention or which will occur to those skilled in the art, are attained, will be quite clear from the following description, taken together with the accompanying drawings, in which:

Figures 1 and 1a together form a side elevation of the supporting structure of a tender, with a part of the tender tank illustrated in section, Fig. 1 being the rear end thereof and Fig. 1a the front end;

Figures 2 and 2a similarly form together a plan view of the structure of Figs. 1 and 1a, but with the tender tank shown only in dotted outline;

Figure 3 is a central longitudinal vertical section, on the line 3—3 of Fig. 4, through one of the truck structures of the vehicle, and Figure 4 is an irregular transverse section on the line 4—4 of Fig. 3, but additionally showing, in outline, a portion of the main frame of the vehicle.

Referring first to Figs. 1–1a and 2–2a, it will be seen that I have illustrated a main tender frame A, supported on a pair of trucks B, and in turn supporting the tender tank C. The tank may be mounted on the frame with an intervening layer of boards or planks 2, and is itself preferably of the type termed "self-supporting", i. e., inherently designed to transmit to the main longitudinal frame structure the weight at the sides of the tank, which overhang said frame structure. Such a tank is illustrated in my issued Patent No. 1,606,284, dated November 9, 1926.

The main frame A of the vehicle comprises, preferably in an integral casting, a box-like longitudinal member 3, a transverse beam 4 at the front end, a beam 5 at the rear end, a laterally extending brake-cylinder bracket 6 midway of the ends, and a cross-structure 7, 7 at each supporting truck. Suitable draw-bar pockets 8, 9, and superjacent buffer pocket 10, are formed, at the front end, at the juncture of members 3 and 4; and a coupler-pocket 11 is formed at the rear at the juncture of members 3 and 5. Some of these parts and the beams 4, 5, it should be observed, are above the plane of the main frame member since this invention contemplates placing the latter even lower than the normal level of the buffer construction 10.

The tank C, it will be seen, rests on the upper plate, web, or rib 12 of the box-structure 3, on the corresponding portion 13 of the cross-structure 7, 7, and on the transverse flanges 14, 15, of the cross-members 4, 5, which latter give the tank C a stable support at all four corners as clearly shown in Figs. 2–2a.

The vertical webs 16, 16, of the longitudinal box-like frame-member 3, are deepened intermediate the two truck structures B, B, to afford a bridge-like strength to the whole underframe. This incidentally simplifies the mounting of the foundation brake rigging, later to be referred to, by making conveniently possible the provision of the brake lever slots 17.

The vertical webs 18, 18, of each cross-frame structure 7 (as indicated in Figs. 1, 1a, 2, 2a and 4) form diagonal braces extending from the side-bearing pads 19, 19, inwardly and downwardly on each side of the centre pin 20 formed within the compass of the longitudinal vertical webs 16; and they fit around, or house, as it were, the upwardly extending ends 21, 21, of the truck bolster, which carry the side bearings 22, 22.

Referring now to the truck structure, it will be seen that each truck is of the six wheel type, having wheels 23, and axles 24, said axles being journalled in boxes (not shown) each located between pedestal jaws 25. The pedestal jaws depend from the truck side frame members 26, between which extend the end and intermediate cross-members or transoms 27, 27 and 28, 28, respectively. These cross-members dip downwardly in the middle, as shown most clearly in Figs. 3 and 4 by the downwardly sloping upper surfaces 27a, 28a. Each of said intermediate cross-members 28 carries a pair of roller bearing seats 29, supported by bracket-like vertical webs 30. The seats 29 form pockets to receive the curved bearing members 31 on which ride rollers 32 for the support of the bolster now to be described.

The truck bolster 33 is roughly of an H shape, the four arms 34 of the H providing recesses for the curved bearing members 35 which rest on top of the rollers 32. The cross-piece of the H, the main member of the bolster, is, as it were, arched or saddled over the centre axle 24 of the truck, being formed of very deep, and low-hanging, truss-like vertical webs 36, one on each side of the axle (see Fig. 3) and a top horizontal web 37. Additional vertical strengthening webs 38 are provided. At each end of the bolster, midway between a pair of the roller bearings, is the upwardly extending portion 21, hereinbefore referred to, which carries a side bearing 22. This, fitting beneath the box-like structure 13, 18, 18 of the cross-frame member 7 of the main vehicle frame, takes every advantage of the available space. At the very centre of the bolster is a pocket or recess 39 (Fig. 4) in which rests the centre pin 20, which is thus positioned very low indeed, being just immediately superjacent the central axle 24 of the truck.

By way of résumé, it will now be clear that the cross-members or transoms 27, 28, of the truck frame, and the bolster 33, are, intermediate their ends, depressed to a very low point, to permit of an unusually low mounting of the centre pin 20 and depressed location of the main longitudinal beam 3 of the main frame; that the upwardly extending ends 21 of the bolster, carrying the side bearings 22, are housed nicely within the box-like cross-frame structure 7 of the main frame, which permits of the proper height of vertical webs for each, to give the necessary strength and rigidity for the loads imposed, while yet providing a much lower overall height; and that the requisite strength of the bolster and transoms to meet the tremendous loads imposed is amply supplied by extending their vertical webs well down below the axle line.

The brake-work is arranged as follows:

The usual brake-cylinder 40 is mounted beneath the side-extension 6 of the main frame. Positioned in and by two of the slots 17 in the main frame 3, are the two main brake levers 41, 41. These are pivotally connected at points 42, 42, intermediate their ends, by a rod 43 having adjusting means 44. The outer end of one rod 41 is pivoted at 45 to a fixed bracket 46, while the outer end of the other is pivoted at 47 to the piston rod 48 of the brake cylinder. This arrangement, it will be observed, provides the necessary equalization between the brake action on the two trucks. The inner ends of the main levers 41, which are located inside the frame structure 3, are pivotally connected at points 49 to the longitudinal pull rods 50. These are likewise located inside the frame, as are also the levers 51, to the centre of each of which is pivoted one of said rods 50 at a point 52.

The ends of levers 51 extend out through slots 17 in the main frame and are thus positioned and supported thereby, as are also the connected operating rods. Each lever 51 operates a complete set of brakes, that is, all the brakes on one truck as follows:

The lever 51 is pivotally connected at its ends to a pair of vertically extending levers 53, which in turn are connected at their ends by rods 54 to a brake beam 55, extending from wheel to wheel and connected to links 56, 56, pivoted at 57 on the truck frame, and operating the brakes 58. Levers 53 are connected, at pivot points near their upper ends, with pull rods 59 which are similarly connected with levers 60. In similar fashion, for each succeeding brake beam 55 which operates two brakes 58, there is a pair of operating levers 60 and pull rods 59 or 61 as the case may be; except that for the last two pairs of levers 60 there is a cross-lever 62, extending transversely just beneath the main frame 3, and pull rods 59a which are positioned laterally outward from the main frame member 3.

It should here be observed, as shown in Fig. 4, that the vertical webs of the truck bolster are provided with clear apertures 63, 63, for the passage of the middle pair of pull rods 59 which are positioned just over the middle axle of the truck.

It will now be clear that the brakes of all wheels of the truck are equalized together, and that the brake action on one truck is equalized with that on the other; and particularly that the construction provides a very convenient arrangement for the mounting or supporting of the foundation brake-work on the main frame. Furthermore, nearly all the pull connections lie either inside the frame, or directly alongside it and beneath the upper flange 12 thereof, and are thus protected from damage. In addition they are all positioned for direct pull longitudinally of the main frame. In short, the whole frame arrangement lends itself admirably to the most advantageous arrangement of brake rigging.

In conclusion, I wish to point out that, heretofore, in a tender having the usual 33" wheels, it has ordinarily been impossible to locate the bottom of the tender tank lower than about 50" above the rail. With my novel form of frame and truck I am able to reduce this height (i. e. the distance between the bottom of the tank and the rail) to about 41" or less, which reduces the height of the centre of gravity of the mass of fuel and water a proportionate amount.

What I claim is:—

1. A railway vehicle supporting structure comprising a truck having longitudinally-extending side frame members, transoms, three axles and their wheels, a main vehicle frame member positioned between said truck side frame members and substantially in their common horizontal plane, and a transverse bolster supported on the transoms and having a centre bearing and a pair of side bearings supporting the main frame in the said position.

2. A railway vehicle supporting structure comprising a truck having longitudinally-extending side frame members, transoms, three axles and their wheels, and a main vehicle frame member lying between said truck side frame members and substantially in their common horizontal plane, together with a bolster lying beneath said main frame member to support the same and supported on transoms of the truck, said bolster providing the sole support of said main frame on said truck.

3. In combination, a wheeled truck having side frame members and cross frame members, the latter dipping downwardly intermediate the former, a bolster supported in a position between cross-members, a main frame member carried on the bolster and lying between the truck side frame members in the space afforded by said dipping cross-members, upwardly extending ends on said bolster forming side bearings, and lateral extensions on said main frame member housing said bolster ends and cooperating with said side bearings.

4. A tender construction including a pair of 6-wheel trucks, and a main frame comprising a central longitudinal member positioned down between the pairs of wheels and cross beams at the ends thereof positioned at a higher plane, together with means on said beams adjacent the bottom thereof for supporting the tender tank, whereby frame rigidity is provided, and at the same time the frame and the tank are positioned at minimum height.

5. A main frame comprising a central longitudinal member, cross-members intermediate the ends thereof constructed each to house a bolster structure and cooperate with the side bearings thereof, and cross beams at the ends of the longitudinal member positioned at a higher plane, with appropriate draft structure at the juncture of said end cross beams and longitudinal member.

6. A main frame comprising a central longitudinal member, cross-members intermediate the ends thereof constructed each to house a bolster structure and cooperate with the side bearings thereof, and cross beams at the ends of the longitudinal member positioned at a higher plane, together with means on said cross beams adapted to support the corners of a tender tank.

7. A main frame comprising a central longitudinal member adapted to transmit draft, and cross-members intermediate the ends thereof with their free ends constructed each to house a bolster structure and cooperate with the side-bearings thereof.

8. A main frame comprising a central longitudinal member adapted to transmit draft, and cross-members intermediate the ends thereof with their free ends constructed each to house a bolster structure and cooperate with the side-bearings thereof, said longitudinal member being formed substantially hollow and with slots in the walls thereof to house and support foundation brake rigging.

9. A main frame comprising a central longitudinal member adapted to transmit draft, and cross-members intermediate the ends thereof with their free ends constructed each to house a bolster structure and cooperate with the side-bearings thereof, together with a center pin structure, at the point of crossing of each said cross-member.

10. A main frame comprising a central longitudinal member adapted to transmit draft, and cross-members intermediate the ends thereof with their free ends constructed each to house a bolster structure and cooperate with the side-bearings thereof, together with a center pin structure, at the point of crossing of each said cross-member, substantially coextensive in vertical depth with said frame.

11. In combination, a truck having a frame including cross-transoms, axles and wheels, a hollow bolster structure saddled over an axle and supported on said cross-transoms and having means of supporting a vehicle frame in close proximity to said axle, and a main longitudinal vehicle frame so supported and lying between the sides of the truck, together with an upward extension at each end of the bolster carrying a side-bearing and being housed in a hollow transverse part of the main vehicle frame.

12. In a railway vehicle, a six-wheel truck having side frame members, and transoms depressed downwardly therebetween, a pair of low-hung brackets on each of two transoms, a substantially H-shaped bolster having its legs extending each over a bracket, and supporting means between each bracket and leg constructed to permit limited lateral movement of the bolster, the cross member of the H-shaped bolster lying over the middle axle of the truck with its vertical flanges embracing the same at the sides.

13. In a railway vehicle, a six-wheel truck having side frame members, and transoms depressed downwardly therebetween, a pair of low-hung brackets on each of two transoms, a substantially H-shaped bolster having its legs extending each over a bracket, and supporting means between each bracket and leg constructed to permit limited lateral movement of the bolster, the cross member of the H-shaped bolster lying over the middle axle of the truck with its vertical flanges embracing the same at the sides, together with a main frame member for the vehicle positioned along the line of depression of said transoms and having a seat on said bolster immediately superjacent said middle axle.

14. In a railway vehicle, a six-wheel truck having side frame members, and transoms depressed downwardly therebetween, a pair of low-hung brackets on each of two transoms, a substantially H-shaped bolster having its legs extending each over a bracket, and supporting means between each bracket and leg constructed to permit limited lateral movement of the bolster, the cross member of the H-shaped bolster lying over the middle axle of the truck with its vertical flanges embracing the same at the sides, together with a main frame member for the vehicle positioned along the line of depression of said transoms and having a seat on said bolster immediately superjacent said middle axle, and box-like lateral extensions on said frame member having deep vertical webs, said bolster having upwardly extending ends shrouded by said webs and engaging the inside of said lateral frame extensions.

15. A tender construction including a main frame, six-wheel trucks supporting the same in close proximity to the truck axles, appropriate buffer construction at the front end of the tender at normal vertical height, and a tank on the frame having its bottom located below said height adjacent the tops of the wheels.

16. A frame, for a vehicle having wheeled trucks, comprising a central longitudinal box-like beam, a lateral bracket for a brake-cylinder, and slots in said beam fore and aft of said bracket for the passage and support of brake levers.

17. In a vehicle, a pair of trucks, a hollow central longitudinal frame member supported thereon, brake rigging on the trucks, a brake cylinder and piston on the vehicle, a pair of main operating levers one of which has a connection to said piston and each of which extends into said hollow frame member, equalizing mechanism between said levers extending along the outside of said member, and operating mechanism lying within the member and connected to the levers and to the brake rigging of the trucks.

18. In a vehicle, a pair of trucks, a hollow central longitudinal frame member supported thereon, brake rigging on the trucks, a brake cylinder and piston on the vehicle, a pair of main operating levers one of which has a connection to said piston and each of which extends into said hollow frame member, equalizing mechanism between said levers extending along the outside of said member, and operating mechanism lying within the member and connected to the levers and to the brake rigging of the trucks, said frame being of increased vertical depth intermediate the trucks.

19. A vehicle supporting structure including a six-wheel truck, a truck frame with cross members depressed in the middle, a bolster mounted in the frame with its mid-portion depressed and having downward extensions on each side of the middle axle to obtain the requisite vertical stiffness, and a main frame structure mounted on said bolster immediately above the axle and lying along the depressed portions of the truck, said main frame structure having vertical webs for stiffness which, in part, house or telescope with parts of the truck structure to minimize overall height.

20. The combination with a vehicle and its supporting axles, of a frame including a central beam of substantial depth extending longitudinally of the vehicle and having a cross member at the top thereof, a truck frame including transoms depressed between the truck axles, and a bolster telescoped over an axle, mounted on the depressed portions of the transoms, and positioned below the beam and having arms extending upwardly at either side of the beam to engage its cross member, said main longitudinal frame and said cross member being of a width less than the width of the truck frame so as to lie down in between the side members of the latter, whereby maximum depth of main and truck frame members is secured with minimum clearance of the bottom of the vehicle over the wheels.

21. A railway vehicle supporting construction comprising a central longitudinal structure as the sole longitudinal main frame member, and a plurality of trucks thereunder having each at least three axles and rigid side and cross frame elements, said member being positioned low, between said truck side frame elements, so as to be in large part below the tops of the wheels.

22. A railway vehicle supporting construction comprising a central longitudinal structure as the sole longitudinal main frame member, and a plurality of trucks thereunder having each an odd number of axles and rigid side and cross frame elements, said member being positioned low, between said truck side frame elements, so as to be in large part below the tops of the wheels.

23. In combination, a wheeled truck having side frame members and cross frame members, the latter dipping downwardly intermediate the former, a bolster supported in a position between cross-members, a main frame member carried on the bolster and lying between the truck side frame members in the space afforded by said dipping cross-members, upwardly extending ends on said bolster forming side bearings, and lateral extensions on said main frame member cooperating with said side bearings whereby the bottom of the vehicle body is brought down just short of the side frame members.

24. In combination, in a railway vehicle, a truck having side frame members with at least three axles journalled therein, truck transom members, a main vehicle frame, a bolster over the middle axle on which the main frame rests, and side bearings between the main frame and the bolster, said main frame being positioned with minimum working clearance over said axles; and said transoms, main frame, and bolster being located approximately as low as the top of the side frame members, with the side bearings positioned with minimum clearance above the wheels, whereby the bottom of the vehicle body is dropped to just above the side frame members and the wheels.

25. In combination, in a railway vehicle, a truck having side frame members with at least three axles journalled therein, truck transom members, a main vehicle frame, a bolster over the middle axle on which the main frame rests, and side bearings between the main frame and the bolster, said main frame being positioned with minimum working clearance over said axles; and said transoms, main frame, and bolster being located approximately as low as the top of the side frame members, with the side bearings positioned with minimum clearance above the wheels, whereby the bottom of the vehicle body is dropped to just above the side frame members and the wheels, all of said cooperating main frame, transom, bolster and bearing elements being positioned intermediate the vertical planes of the two side frame members of the truck.

In testimony whereof I have hereunto signed my name.

WILLIAM E. WOODARD.